Feb. 12, 1946.  A. E. MEYER  2,394,628
WATER DISPERSIBLE HORMONE PREPARATIONS AND METHOD OF PREPARING SAME
Filed Dec. 4, 1941
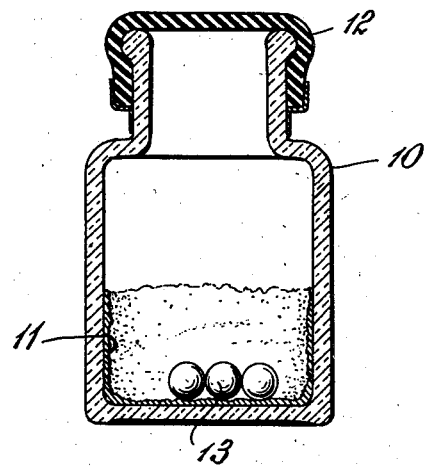
INVENTOR
Arthur E. Meyer
BY
ATTORNEYS Patented Feb. 12, 1946

2,394,628

UNITED STATES PATENT OFFICE 2,394,628

WATER DISPERSIBLE HORMONE PREPARATIONS AND METHOD OF PREPARING SAME

Arthur E. Meyer, Flushing, N. Y., assignor to The Maltine Company, Brooklyn, N. Y., a corporation of New York Application December 4, 1941, Serial No. 421,545

16 Claims. (Cl. 167—74)

This invention relates to hormones and more particularly it relates to hormones which are difficultly soluble in water. The invention provides new hormone compositions which may be readily suspended in water as well as a new process by which such compositions may be prepared. The invention also includes a package containing the new compositions.

The relatively slight water-solubility of hormones such as the male or female sex hormones is well known. As a practical matter, water solutions of such hormones cannot be administered hypodermically because an effective therapeutic dose of the hormone would require the injection of an extremely large amount of the solution.

To overcome this difficulty it has been proposed to use these hormones by dissolving them in an oil, such as sesame oil, in which they have a substantial solubility. The injection of such solutions, however, tends to form lumps at the place of injection and frequently is quite painful. Occasionally it also leads to the sensitization of the patient. Such solutions are generally packaged in glass ampules, the necks of which must be broken before the solution can be removed. To prevent contamination of the solution it is administered as soon as possible after the ampule has been opened. Such ampules frequently contain more of the hormone than is desired as a therapeutic dose for a particular patient, and this excess hormone solution must be discarded since its exposure to the air soon makes it unsterile.

It has also been proposed to administer hormones such as the male or female sex hormones by implanting a pellet of the hormone beneath the surface of the skin. The hormone is then slowly absorbed. Such a procedure requires the making of an incision and it is considered objectionable by some for this reason.

This invention provides new hormone compositions which when treated with water will be formed into suspensions or dispersions containing the hormone in the form of small particles. These suspensions may be administered hypodermically without the objectionable side reactions incident to the use of oil solutions of the hormone. The effect of injecting an aqueous suspension of the new compositions is similar to that produced by the implantation of a pellet of the hormone except that since the particles of the hormone in suspension are comparatively small in size, a much larger surface is presented and the hormone will be absorbed in a relatively short time. Obviously such a procedure has a decided advantage over the implantation technique since no incision is necessary.

In accordance with this invention the new hormone products are prepared by forming a solution of the hormone in a non-aqueous solvent containing a dissolved non-toxic water-soluble crystallization retarding agent and then evaporating the solvent from the resulting mixture. The new product produced by this procedure in the dry state comprises the hormone in intimate association with the crystallization retarding agent. This product is quite stable and may be stored for substantial periods of time without deterioration of the activity of the hormone.

The new product is advantageously prepared by introducing a sufficient amount of the non-aqueous solution of the hormone and the crystallization retarding agent into a container so that upon the evaporation of the solvent the desired dosage of the hormone will be deposited as a residue. The container is then sealed under sterile conditions. The container is advantageously provided with a perforable, self-sealing closure and the hormone product may then be used by puncturing this closure and introducing water into the container by means of a hypodermic needle. Upon the introduction of water into the container the crystallization retarding agent dissolves and the hormone in association therewith is formed into a suspension which may be injected hypodermically.

The process of this invention is applicable to various hormones which are difficultly soluble in water. Such hormones or their derivatives may be derived from natural sources or may be prepared synthetically. Among these hormones are estrogenic or female sex hormones such as estrone, estradiol, estriol, or their derivatives; male sex hormones such as androsterone, testosterone, or their derivatives; the corpus luteum hormone, progesterone, or its derivatives; the adrenal cortex hormone, corticosterol, etc.

In preparing solutions of the difficultly soluble hormones in non-aqueous solvents a considerable variety of solvents may be employed since these hormones are in general soluble in the usual organic solvents. Among the solvents which may be employed with advantage are ethyl alcohol, acetone, ether, benzene, petroleum ether, etc. Since the solvent is to be evaporated, it is advantageous to employ a solvent having a relatively low boiling point.

The crystallization retarding agent serves to prevent the formation of hormone particles of too large a size when the non-aqueous solvent is evaporated from the solution of the hormone and the retarding agent. Advantageously the retarding agent also has the property of forming a deposit with the hormone on evaporation of the solvent which when treated with water will come off easily from the wall of the container in which it is formed. The use of such a retarding agent facilitates the suspension of the hormone when the product is treated with water. Since the composition containing the hormone and the retarding agent is to be used for therapeutic purposes the retarding agent should be non-toxic and in general should have no physiological activity. Among the suitable non-toxic, water-soluble crystallization retarding agents which may be used in accordance with this invention are hexamethylenetetramine, dextrose, mannitol, the amide of nicotinic acid, etc.

The preparation of a new hormone product in accordance with this invention will be illustrated by the following examples in which reference will be made to the accompanying drawing which shows a new package containing the hormone product.

Example 1

A 3% solution of hexamethylenetetramine in ethyl alcohol is treated with enough estrogenic hormone so that each cc. of solution contains one milligram of the hormone. A measured amount of this solution is then filled into a suitable container 10 such as is shown in the accompanying drawing. The solvent is then evaporated resulting in the formation of a deposit 11 along the walls of the container. The container is then sealed under sterile conditions with a perforable rubber closure 12 and may then be stored until it is desired to use the hormone product.

In using this product for therapeutic purposes sterile water is introduced into the container through the perforable closure 12 by means of a hypodermic needle. The container is then agitated, as by shaking it in the hand, with the result that the deposit in the container is formed into an aqueous suspension or dispersion of the hormone, the crystallization retarding agent going into solution. To facilitate the rapid separation of the deposit from the walls of the container, it is sometimes desirable to introduce one or more glass beads 13 into the container before it is sealed. Agitation of the container causes the beads to move along the sides of the wall and aids in the suspension or dispersion of the hormone.

The aqueous hormone suspension produced by the procedure just described in general contains hormone particles of a size no greater than about 2 microns, although occasionally some larger particles having a maximum size of about 25 microns may be observed.

Example 2

A hormone product is prepared by the procedure described in Example 1 using a 3% solution of the amide of nicotinic acid instead of a solution of hexamethylene tetramine. The resulting product on being treated with water forms a suspension or dispersion in which most of the hormone particles are in the form of crystals ranging from about 1 to 2 microns in size although a few crystals of about 10 microns in size may be present.

The hormone containing package referred to in Example 1 has important advantages since it makes possible the formation under sterile conditions of aqueous suspensions of the hormone. Furthermore if all the suspension is not used for immediate injection purposes, the remainder may be saved and used subsequently without contamination, since the perforable self-sealing closure on the package substantially prevents access of air to the suspension. The aqueous hormone suspensions are sufficiently stable so that they may be used several weeks or more after they have been prepared.

In preparing the new package the amount of hormone solution introduced into the container is advantageously regulated so that a therapeutic dose of the hormone will be deposited upon evaporation of the solvent. In preparing small packages it is advantageous to evaporate about 2 cc. of a solution containing 1 milligram of the hormone per cc. in the package. The introduction of about 2 cc. of water into such a package when the hormone is to be used results in the formation of a suspension containing about 1 milligram of the hormone per cc. By withdrawing regulated amounts of the suspension, the desired therapeutic dose may be administered to the patient.

I claim:

1. The process of preparing dry, water-dispersable compositions of hormones which are difficultly soluble in water which comprises forming a solution of the hormone in an organic solvent containing a dissolved non-toxic water-soluble, crystallization retarding agent from the class consisting of hexamethylene tetramine, the amide of nicotinic acid, dextrose and mannitol, and then evaporating the solvent from the resulting mixture, leaving a dry, solid admixture of the hormone and the added agent suitable for administration by injection after suspension in water.

2. The process of preparing dry, water-dispersable compositions of hormones which are difficultly soluble in water which comprises forming a solution of the hormone in an organic solvent containing hexamethylene tetramine, and then evaporating the solvent from the resulting mixture, leaving a dry, solid admixture of the hormone and the added agent suitable for administration by injection after suspension in water.

3. The process of preparing dry, water-dispersable compositions of hormones which are difficultly soluble in water which comprises forming a solution of the hormone in an organic solvent containing the amide of nicotinic acid, and then evaporating the solvent from the resulting mixture, leaving a dry, solid admixture of the hormone and the added agent suitable for administration by injection after suspension in water.

4. The process of preparing dry, water-dispersable compositions of hormones which are difficultly soluble in water which comprises forming a solution of the hormone in an organic solvent containing dextrose, and then evaporating the solvent from the resulting mixture, leaving a dry, solid admixture of the hormone and the added agent suitable for administration by injection after suspension in water.

5. The process of preparing dry, water-dispersable compositions of estrogenic hormones which comprises forming a solution of the estrogenic hormone in an organic solvent containing a dissolved non-toxic water-soluble crystallization retarding agent from the class consisting of hexamethylene tetramine, the amide of nicotinic acid, dextrose and mannitol, and then evaporating the solvent from the resulting mixture, leaving a dry, solid admixture of the hormone and the added agent suitable for administration by injection after suspension in water.

6. The process of preparing dry, water-dispersable compositions of estrogenic hormones which comprises forming a solution of the estrogenic hormone in an organic solvent containing hexamethylene tetramine, and then evaporating the solvent from the resulting mixture, leaving a dry, solid admixture of the hormone and the added agent suitable for administration by injection after suspension in water.

7. The process of preparing dry, water-dispersable compositions of estrogenic hormones which comprises forming a solution of the estrogenic hormone in an organic solvent containing the amide of nicotinic acid, and then evaporating the solvent from the resulting mixture, leaving a dry, solid admixture of the hormone and the added agent suitable for administration by injection after suspension in water.

8. The process of preparing dry, water-dispersable compositions of extrogenic hormones which comprises forming a solution of the estrogenic hormone in an organic solvent containing dextrose, and then evaporating the solvent from the resulting mixture, leaving a dry, solid admixture of the hormone and the added agent suitable for administration by injection after suspension in water.

9. A new dry, water-dispersable hormone product comprising a hormone which is difficultly soluble in water in intimate association with a non-toxic, water-soluble crystallization retarding agent from the class consisting of hexamethylene tetramine, the amide of nicotinic acid, dextrose and mannitol.

10. A new dry, water-dispersable hormone product comprising a hormone which is difficultly soluble in water in intimate association with hexamethylene tetramine.

11. A new dry, water-dispersable hormone product comprising a hormone which is difficultly soluble in water in intimate association with the amide of nicotinic acid.

12. A new dry, water-dispersable hormone product comprising a hormone which is difficultly soluble in water in intimate association with dextrose.

13. A new dry, water-dispersable hormone product comprising an estrogenic hormone in intimate association with a non-toxic, water-soluble crystallization retarding agent from the class consisting of hexamethylene tetramine, the amide of nicotinic acid, dextrose and mannitol.

14. A new dry, water-dispersable hormone product comprising an estrogenic hormone in intimate association with hexamethylene tetramine.

15. A new dry, water-dispersable hormone product comprising an estrogenic hormone in intimate association with the amide of nicotinic acid.

16. A new dry, water-dispersable hormone product comprising an estrogenic hormone in intimate association with dextrose.

ARTHUR E. MEYER.